United States Patent
Schäl

(10) Patent No.: US 8,740,316 B2
(45) Date of Patent: Jun. 3, 2014

(54) COMPRESSED AIR PREPARATION DEVICE

(75) Inventor: Andreas Schäl, Nordstemmen (DE)

(73) Assignee: WABCO GmbH, Hannover (DE)

(*) Notice: Subject to any disclaimer, the term of this patent is extended or adjusted under 35 U.S.C. 154(b) by 190 days.

(21) Appl. No.: 13/521,103

(22) PCT Filed: Nov. 26, 2010

(86) PCT No.: PCT/EP2010/007179
§ 371 (c)(1),
(2), (4) Date: Jul. 9, 2012

(87) PCT Pub. No.: WO2011/103893
PCT Pub. Date: Sep. 1, 2011

(65) Prior Publication Data
US 2012/0285327 A1    Nov. 15, 2012

(30) Foreign Application Priority Data
Feb. 24, 2010  (DE) .................. 10 2010 009 035

(51) Int. Cl.
*B60T 17/02*  (2006.01)
*B60T 17/00*  (2006.01)
*B60T 17/04*  (2006.01)
*B60T 17/18*  (2006.01)

(52) U.S. Cl.
CPC ............. *B60T 17/02* (2013.01); *B60T 17/002* (2013.01); *B60T 17/04* (2013.01); *B60T 17/18* (2013.01); *Y10S 55/17* (2013.01)
USPC ...................... 303/3; 137/115.18; 55/DIG. 17

(58) Field of Classification Search
CPC ....... B01D 53/04; B60T 17/02; B60T 17/002; B60T 17/04; B60T 17/18
USPC ...... 95/117; 96/108; 55/DIG. 17; 34/80, 472, 34/473; 303/3; 137/115.19
See application file for complete search history.

(56) References Cited

U.S. PATENT DOCUMENTS

| 5,592,754 A | * | 1/1997 | Krieder et al. ................. 34/527 |
| 5,917,139 A | * | 6/1999 | Goodell et al. ................ 96/113 |
| 6,540,308 B1 | | 4/2003 | Hilberer |
| 6,858,066 B2 | * | 2/2005 | Quinn et al. ................... 95/121 |
| 7,080,891 B1 | | 7/2006 | Hilberer |
| 8,220,876 B2 | * | 7/2012 | Detlefs et al. .................... 303/3 |
| 2010/0071779 A1 | | 3/2010 | Bordacs |

FOREIGN PATENT DOCUMENTS

| DE | 41 41 696 A1 | 7/1993 |
| DE | 196 38 837 A1 | 3/1998 |
| DE | 198 21 420 C1 | 10/1999 |
| DE | 198 35 638 A1 | 2/2000 |
| DE | 199 36 283 A1 | 2/2001 |
| DE | 10 2007 013 671 A1 | 9/2008 |
| DE | 10 2008 026 103 A1 | 12/2009 |
| WO | WO 2007/142008 A1 | 12/2007 |

* cited by examiner

*Primary Examiner* — Frank Lawrence, Jr.
(74) *Attorney, Agent, or Firm* — Kramer Levin Naftalis & Frankel LLP

(57) ABSTRACT

For a motor vehicle, a compressed air preparation device includes a pressure line configured to conduct compressed air, a drying device disposed in the pressure line, a governor valve coupled to the drying device, and an electrically actuatable solenoid valve, the governor valve being (i) pilot controllable by the solenoid valve at a high pressure level to allow the compressed air to be fed through the pressure line when the solenoid valve is actuated and (ii) configured to control regeneration of the drying device in response to a low pressure level from the solenoid valve when an electrical supply to the solenoid valve fails.

10 Claims, 5 Drawing Sheets

COMPRESSED AIR PREPARATION DEVICE

FIELD OF THE INVENTION

The present invention generally relates to a compressed air preparation device that allows a motor vehicle to travel without restrictions even in the event of a failure of the electrical control of the valves of the compressed air preparation device.

BACKGROUND OF THE INVENTION

Motor vehicles have pneumatically operated devices, for example, compressed air brake systems, which have to be supplied with compressed air. The compressed air is usually provided by a compressor that sucks in air from the atmosphere and outputs a compressed air flow into the pressure line. Since the air moisture contained in the air condenses and can cause corrosion, which considerably shortens the service life of components, the compressed air is dried after leaving the compressor, before it is fed into the line network. For this purpose, a dryer unit is arranged in the pressure line. It is known to arrange feed control elements at the inlet of the pressure line in order to switch the compressed air delivery by the compressor on and off, and to control the pressure in the pressure line and therefore in the consumer network. The feed control element can be a control input of the compressor, which is actuated by way of compressed air.

DE 196 38 837B4 discloses a pressure medium preparation device that provides a compressor for supplying pressure medium and a 3/2-way valve as a feed control element assigned to the compressor. The continuous compressed air flow that is produced can be fed via the feed control valve either to those elements of the pressure preparation device that are connected downstream or to atmosphere. The feed control valve can be actuated by compressed air by means of its control input. In the known device, an air dryer and a non-return valve are connected downstream of the feed control valve. Here, a multiple-circuit protective valve is connected to the non-return valve as well as individual pressure medium circuits of the pressure medium system. A pressure regulating device is connected to the control input of the feed control valve, and can connect a store line that branches off from the pressure line downstream of the non-return valve to the control input of the feed control valve, in order to suppress the compressed air supply to the pressure line. In the known arrangement, the pressure regulating device consists of a pressure-actuatable governor valve and an electrically actuatable control valve. A first control input of the governor valve is connected to the store line and operates counter to a permanent restoring force of a valve spring. The output of the governor valve is connected to the feed control valve. The electrically actuatable control valve is likewise connected by way of its input to the store line and is connected by way of its output to a second control input of the governor valve, the second control input acting counter to the first control input of the governor valve. The electrically actuatable control valve or its control input is connected via an electrical line to an electronic control unit. The control unit generates a control signal for controlling the valve as a function of a pressure measurement in the store line and therefore the pressure line.

The electrically actuatable valve acts as pilot controller of the governor valve and causes a switchover of the governor valve for acting on the compressed air feed into the pressure line. As soon as the electrically actuated valve connects the second control input of the governor valve to the store line, the control forces of the two pressure-controlled inputs of the governor valve cancel one another out and the restoring force of its valve spring switches the governor valve into the open position. In this switching position, the store line is connected to the feed control valve at the compressor, with the result that the compressed air feed into the pressure line is disconnected and the compressed air flow from the compressor is fed to atmosphere.

Although, in the known device, the pressure control takes place during normal operation via the electrically actuatable valve, the known device can maintain an emergency mode in the event of a power failure and therefore a failure of the control valve, the feed control taking place solely in a pressure-dependent manner. In the event of a power failure, the electrically actuatable valve is switched into the non-open position, with the result that the second control input of the governor valve is likewise not actuated. The governor valve then connects the store line to the feed control valve if the pressure in the pressure line and therefore the store line overcomes the counteracting spring force via the first control input of the governor valve. The provided governor switchover pressure that is maintained by the governor via corresponding switching of the compressed air feed is defined by the setting of the restoring force of the valve spring of the governor valve.

Although, in the event of a failure of the electrical control energy, the known compressed air preparation device can maintain pressure-dependent control of the working pressure via the governor valve in an emergency mode, unrestricted journey continuation of the motor vehicle is not possible by way of the known compressed air preparation device, since the quality of the compressed air preparation decreases very rapidly after a failure of the electrical control energy.

SUMMARY OF THE INVENTION

Generally speaking, it is an object of the present invention to provide a compressed air preparation device having a pressure line that conducts compressed air, a drying device disposed in the pressure line, a pressure-actuatable governor valve coupled to the drying device, and an electrically actuatable solenoid valve, the governor valve being (i) pilot controllable by the solenoid valve at a high pressure level to allow the compressed air to be fed through the pressure line when the solenoid valve is actuated and (ii) configured to control regeneration of the drying device in response to a low pressure level from the solenoid valve when an electrical supply to the solenoid valve fails.

Because the drying device, which is required for air conditioning, removes the moisture by condensation and adsorption from the compressed air that is flowing through, and because the adsorption agent in the drying device has a limited water absorbing capacity, the drying device has to be regenerated at certain intervals. If the known device for controlling the compressed air preparation device switches into the emergency mode in the event of a failure of the electrical control energy, although driving operation of the motor vehicle is first of all maintained, the water absorption capacity of the drying device is exhausted quickly, with the result that the functioning of the compressed air preparation device is no longer ensured.

According to an embodiment of the present invention, in the event of a failure of the electrical power supply of the controller of the valves of the compressed air preparation device, regeneration of the drying device is regularly carried out by way of a governor valve, which continues to be active. A motor vehicle that is equipped with the compressed air preparation device can therefore continue its journey in a virtually unrestricted manner. During powerless operation, the governor valve assumes the control of both the compressed air preparation device and the regeneration of the drying device.

A governor valve is understood to be a pressure-actuatable valve that acts on the controller of the compressed air feed, and the system pressure that the compressed air preparation device produces for the connected pneumatic circuits acts on the governor valve control input. There is pilot control of the governor valve if a second control input of the governor valve, which acts counter to the first control input, can be loaded with the system pressure as a function of the pilot controlling solenoid valve.

According to an embodiment of the present invention, the governor valve is pilot controlled by an electrically actuatable solenoid valve during electrical operation, and controls the compressed air preparation device at a high pressure level. In the event of a failure of the electrical power, and thus a failure of the pilot control, the governor valve responds if a pressure prevails that overcomes the mechanical restoring force (e.g., a spring force) of the governor valve. The second pressure level, at which the governor valve responds in the event of a failure in the electrical supply, is lower than the high pressure level in the event of electrically actuated pilot control, with the result that further operation of the compressed air preparation device takes place at a lower pressure level when a failure of the electrical supply occurs.

According to an advantageous embodiment, a supply connection of the governor valve is connected to a store line that branches off from a system pressure line that adjoins the pressure line. The pressure line and the system pressure line are separated by a non-return valve. A working connection of the governor valve is connected to a pressure-actuatable feed control element that suppresses the compressed air feed to the drying device if the control pressure prevails, and makes regeneration possible. Here, a working connection is to be understood as a connection of a valve that, depending on the valve position, can be connected to the supply connection of the valve that is constantly loaded with pressure and serves to supply compressed air. If a valve has a ventilating connection, this connection is of such type that can be connected to the working connection as an alternative to the supply connection. In order to carry out the regeneration, the working connection and the supply connection of the governor valve are connected to one another by the first control input of the governor valve that is connected to the store line and that works counter to a permanent restoring force.

A regeneration line connected to the governor valve and a ventilating line are provided to carry out the regeneration. The regeneration line for feeding regeneration air for the drying device opens into the pressure line downstream of the drying device in the through-flow direction of the pressure line. The ventilating line branches off from the pressure line upstream of the drying device in the through-flow direction and is opened during the regeneration.

Compressed air can be guided through the regeneration line to the drying device at the moment the governor valve assumes the open position, and through the regeneration line that is connected to the governor valve.

In the open switching position of the governor valve between the store line and the regeneration line, a through-flow of the drying device in the opposite flow direction is possible, in order to regenerate the drying agent. The regeneration air flow carries the moisture out of the drying device. The regeneration air flow can be discharged through the ventilating line that branches off from the pressure line upstream of the drying device in the through-flow direction. Here, the regeneration line is expediently coupled to the pressure line between the drying device and the non-return valve, with the result that, in order to regenerate the dryer, compressed air can flow back out of the system containers, bypassing the non-return valve.

According to one embodiment, the regeneration line is arranged between the governor valve and the pressure line, and regeneration of the drying device with compressed air out of the system containers can take place using simple means, where a separate regeneration container for the drying device can be omitted. The regeneration air is removed from a store line that branches off from the system pressure line downstream of the non-return valve of the pressure line. The store line therefore assumes both the function of feeding regeneration air and pressure-dependent control of the governor valve during powerless operation.

In a preferred embodiment, the governor valve suppresses the compressed air feed to the drying device in its open position during regeneration operation by opening the ventilating line. To this end, a pressure-actuatable ventilating valve is arranged in the ventilating line, the control input of which ventilating valve is fluidly connected to the regeneration line. As a result, the ventilating line is opened only after initiation of the regeneration by connection of the regeneration line to the store line.

During mechanical operation, that is, without electrical supply of the valves, the ventilating valve also functions as a feed control element for the compressed air feed in the pressure line. In the case of an open ventilating line, the fed compressed air flow of a compressor is discharged through the ventilating line. In order to make both feed control and regeneration possible during powerless operation, the opening pressure of the ventilating valve is coordinated with the response pressure of the governor valve, with the result that the ventilating valve opens reliably during ventilating of the store line by the governor valve.

In an embodiment of the present invention, precise control of the regeneration is possible if the electrically actuatable solenoid valve that pilot controls the governor valve is arranged as a regeneration valve that controls the air flow in the regeneration line. Here, a supply connection of the regeneration valve is connected to the store line and can be connected by switching of an electrical control input to a working connection that is connected to the second control input of the governor valve. The second control input acts counter to the first control input of the governor valve. As a result, the governor valve is pilot controlled by the regeneration valve, with the result that the regeneration is carried out upon corresponding switching of the regeneration valve, and the governor valve assumes the control in the event of a failure of the electrical power supply.

Here, a further electrically actuatable solenoid valve is arranged as a compressor valve that controls the compressed air feed, as a result of which the regeneration operation of the compressed air preparation device is decoupled from the pressure control in the event of electrical control. For this purpose, the compressor valve is arranged between the store line and a control input of a feed control element. During normal operation of the compressed air preparation device, the regeneration can therefore be carried out at controllable time intervals, by the regeneration valve being switched. The pressure control takes place in an uncoupled manner therefrom by the compressor valve being switched into the open position by feeding an electrical signal, and, results in a working connection of the compressor valve, which is connected to the feed control element being connected to a supply connection.

The feed control element assigned to the compressor valve is arranged in the pressure line upstream of the drying device in the through-flow direction and controls the feed of the compressed air into the pressure line. A pressure-actuatable control switch of the compressor advantageously forms the feed control element, with the result that the compressor is controlled directly. As an alternative, a pressure-actuatable control output of the compressor can also be provided as feed control element, which control output guides the compressor air flow into the atmosphere if the pneumatic control signal is present. In a further alternative embodiment, a separate 3/2-way valve in the pressure line forms the feed control element in the event of electrical control of the compressed air preparation device.

During normal operation, the ventilating valve keeps the ventilating line closed, with the result that pressure losses are avoided in the pressure line. Should the electrical power supply of the compressed air preparation device, and therefore the switching of the compressed air feed via the compressor valve fail, the ventilating valve forms the feed control element of the compressed air preparation device. During powerless backup operation, the governor valve opens the ventilating valve when the predefined switch-off pressure is reached in the store line, with the result that the compressed air flow of the compressor is discharged through the ventilating line. Since the governor valve closes only after a certain pressure hysteresis, the ventilating valve remains open until the system pressure falls below a switch-back pressure, which is defined by the switch-off pressure minus the hysteresis. The ventilating valve can be a simply designed 2/2-way valve, the control input of which cancels the shutting of the ventilating line counter to a spring force under the pressure of the regeneration line and switches the ventilating line to open. At the same time, during powerless backup operation, the regeneration of the drying agent is initiated by back-flowing air when the switch-off pressure is reached. This regeneration is again carried out until the governor valve closes again, that is, until the system pressure falls below the switch-off pressure minus hysteresis.

If a non-return valve is arranged in the regeneration line, the pressure control valves are protected reliably against the pressure of the pressure line and avoid undesirable outflow from the pressure line.

If a throttle element is arranged in the regeneration line, the compressed air that flows back out of the system containers during the regeneration is relieved to the suitable pressure level before being fed to the dryer. Here, the throttle element can be configured as a diaphragm or, in one advantageous embodiment, as a switchable throttling valve.

According to one embodiment, an assembly can be provided as a basis for electrically and mechanically controlled compressed air preparation devices. Depending on the use, further components can be added and optionally connected in different ways to the substantially identical basic assembly.

The regeneration valve is advantageously configured as a 3/2-way valve, the third connection of which acts as ventilating means, with the result that the second control input of the governor valve is ventilated using simple means after regeneration of the drying device. In the non-actuated switching position, the 3/2-way regeneration valve connects the control input of the governor valve to the ventilating line, with the result that, if the control signal is present at the regeneration valve and the regeneration valve is transferred into the second switching position, the control pressure is applied immediately to the control input of the governor valve.

In an embodiment of the invention, both electrically actuatable solenoid valves, that is, the regeneration valve and the compressor valve, are actuated by an electronic control unit, with the result that precise control of the working pressure in the compressed air system of the motor vehicle and cyclical regeneration of the drying device can take place according to predefined characteristic diagram data. Here, suitable measuring parameters are input to the control unit and the previously determined optimum control values are predefined, with the result that optimum actuation of the regeneration valve and/or compressor valve can take place to control the compressed air feed. Should the electrical control power fail, the compressed air preparation device switches into emergency operation (backup) and the governor valve assumes the pressure control and the control of the dryer regeneration.

The regeneration valves can be configured with an opening diameter of 1 mm, for example, in order to ensure the pneumatic actuation of the governor valve. An opening diameter of 1.6 mm is considered to be advantageous for the compressor valve, in order to ensure reliable switching of the feed control element and of the pressure line and of the controllable pressure outlet of the compressor. The governor valve is advantageously equipped with a greater opening diameter than the electrically actuatable solenoid valves, in order to ensure sufficient through-flow of the regeneration air flow. A value of approximately 2 mm is considered to be advantageous for the opening diameter of the governor valve.

In one embodiment of the invention, the flow of the regeneration air is defined by means of a throttling valve, which can be switched by pressure actuation and the control input of which is connected to the regeneration valve. As a result, for as long as the regeneration valve, in its actuated state, loads and pilot controls the governor valve, the regeneration valve also acts on the throttling valve and can switch off, for example, that passage cross-section of the throttling valve which is provided for regeneration operation. The switchable throttling valve makes a switchable change in the opening of the regeneration line possible, with the result that there are a multiplicity of coupling options for refining and varying the pressure control and regeneration control during normal operation by way of electrical control signals.

The switchable throttling valve advantageously has a coupling input that can be switched by pressure actuation, is connected to the working connection of the compressor valve, and acts counter to the actuation of the throttling valve by the control input and counter to the restoring force of a valve spring. As a result, in an electrically controlled air preparation device, the regeneration operation is linked directly to the switching off of the compressed air feed into the pressure line. If, after regeneration, the regeneration valve is loaded again with the electrical switching signal, the pressure forces of the counteracting pressure inputs of the throttling valve cancel each other out and the valve spring switches the throttling valve into the second switching position, which is provided for the remaining operating modes outside of regeneration operation.

The switchable throttling valve advantageously has two switching states with different passage cross-sections, with the result that an optimum passage cross-section for the normal operation of the device and control of the regeneration can be selected via the regeneration valve. For the second switching position of the throttling valve, into which the throttling valve falls if the second control input that is connected to the compressor valve is not loaded, the optimum passage cross-section is provided for the backup operation in the event of control via the governor valve. Here, the passage cross-section in the non-actuated state of the throttling valve, that is, the passage cross-section provided for the regeneration in backup operation, is expediently smaller than the passage cross-section in the actuated state for electrical control operation. Via the actuation of the compressor valve in regeneration operation, the throttling valve is also actuated and the larger passage cross-section is set. In backup operation, the governor valve keeps the system pressure in the region between the switch-off pressure and the switch-back pressure, which results from the switch-off pressure minus hysteresis. As a result of the regeneration that takes place at the same time, compressed air escapes permanently from the system in this mode. A smaller cross-section is therefore advantageous, in order to avoid an excessively rapid drop in the system pressure and therefore to save energy that could be necessary for refilling up to the switch-off pressure. For normal operation, a passage cross-section of approximately 1.5 mm is expedient. For the passage cross-section in backup operation, a smaller passage cross-section of approximately 0.5 mm is sufficient.

In a further advantageous embodiment of the invention, as an alternative to being arranged in the regeneration line, the switchable throttling valve is instead arranged in a connecting line that opens into the pressure line parallel to the regeneration line and downstream of the drying device in the through-flow direction. The connecting line can be connected to the store line by means of the compressor valve for the compressed air control. In this way, in regeneration operation of the electrically controlled compressed air preparation device, a large passage cross-section is available for a strong regeneration air flow, since dry compressed air can flow out of the system containers in parallel through the regeneration line and the likewise open connecting line. In order for it to be possible to switch a fluid connection between the store line and the connecting line, the working connection of the compressor valve is connected either to the supply connection of the throttling valve or a pressure-dependent coupling inlet of the throttling valve, the supply connection of the throttling valve being connected to the store line in one embodiment.

In backup operation, in the event of failure of the electrical power supply of the valves, the governor valve assumes the pressure-dependent switching of the regeneration as described above.

In backup operation without electrical control, the compressed air for the regeneration flows through the regeneration line, bypassing the throttling valve.

A further advantage of the arrangement of the throttling valve in a parallel connecting line is the option of optimum discharging operation ("cold dump") with a reduced throughput with respect to an electrically controlled regeneration operation. Here, an electrical control signal is fed to neither the compressor valve for the pressure control nor the regeneration valve, with the result that, under the pressure of the store line, the governor valve opens the flow path through the ventilating line. The discharging operation is set in the meantime by the electrical control unit at cold ambient temperatures, in order to counteract icing of the pressure line and the assemblies arranged therein and the ventilating valve by means of warm air from the compressor. In discharging operation, the return flow takes place only via the regeneration line. A lower mass flow through the dryer is therefore set, with the result that the through-flow of the drying device in the opposite direction is restricted.

As a result of the connection of the switching of the throttling valve to the switching position of the compressor valve, the regeneration during normal operation with electrical control is coupled directly to the switching off of the compressed air feed by the compressor. In the event of a resumption of the compressed air feed by switching over the compressor valve, the flow path in the opposite direction is shut off without any delay by the same valve element, namely that of the compressor valve.

According to a further embodiment of the invention, there is a direct through-flow of the regeneration air to the dryer without flowing through other valves than the throttling valve if the supply connection of the throttling valve in the connecting line is connected to the store line. Here, a second control input of the throttling valve that acts counter to the first control input, which is connected to the regeneration valve, is connected to the working connection of the compressor valve. Accordingly, in the event of an open position of the compressor valve, the pressure at the supply connection of the compressor valve, that is, the system pressure, acts on the coupling inlet of the throttling valve. In the event of an open position of the throttling valve, compressed air flows directly out of the store line to the throttling valve and subsequently through the connecting line into the pressure line, with the result that the electrically actuatable solenoid valves are not flowed through and are loaded less.

It is also an advantage of the supply of the connecting line directly from the store line that the working connection of the compressor valve serves only for signal transmission, and the feed control element of the compressor can therefore be switched more reliably. The compressor valve can also have smaller structural dimensions and costs are saved as a result.

The throttling element in the regeneration line can be a diaphragm with a smaller passage cross-section than the cross-section of the throttling valve, with the result that, in discharging operation, the desired reduced air flow in the opposite through-flow direction is produced, while still being sufficient for a regeneration in backup operation.

A switchable throttling valve in the connecting line can advantageously be configured with two switching states with different passage cross-sections. As a result, the relief of the dry compressed air out of the system containers is conveyed during backup operation at the pressure level, which is reduced to governor switchover pressure, by setting of an optimized passage cross-section.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

Exemplary embodiments of the invention are explained in greater detail below with reference to the appended drawing figures, in which.

In each case, the same designations are used in the figures of the drawings for identical components.

DETAILED DESCRIPTION OF THE PREFERRED EMBODIMENTS

Figure 1:
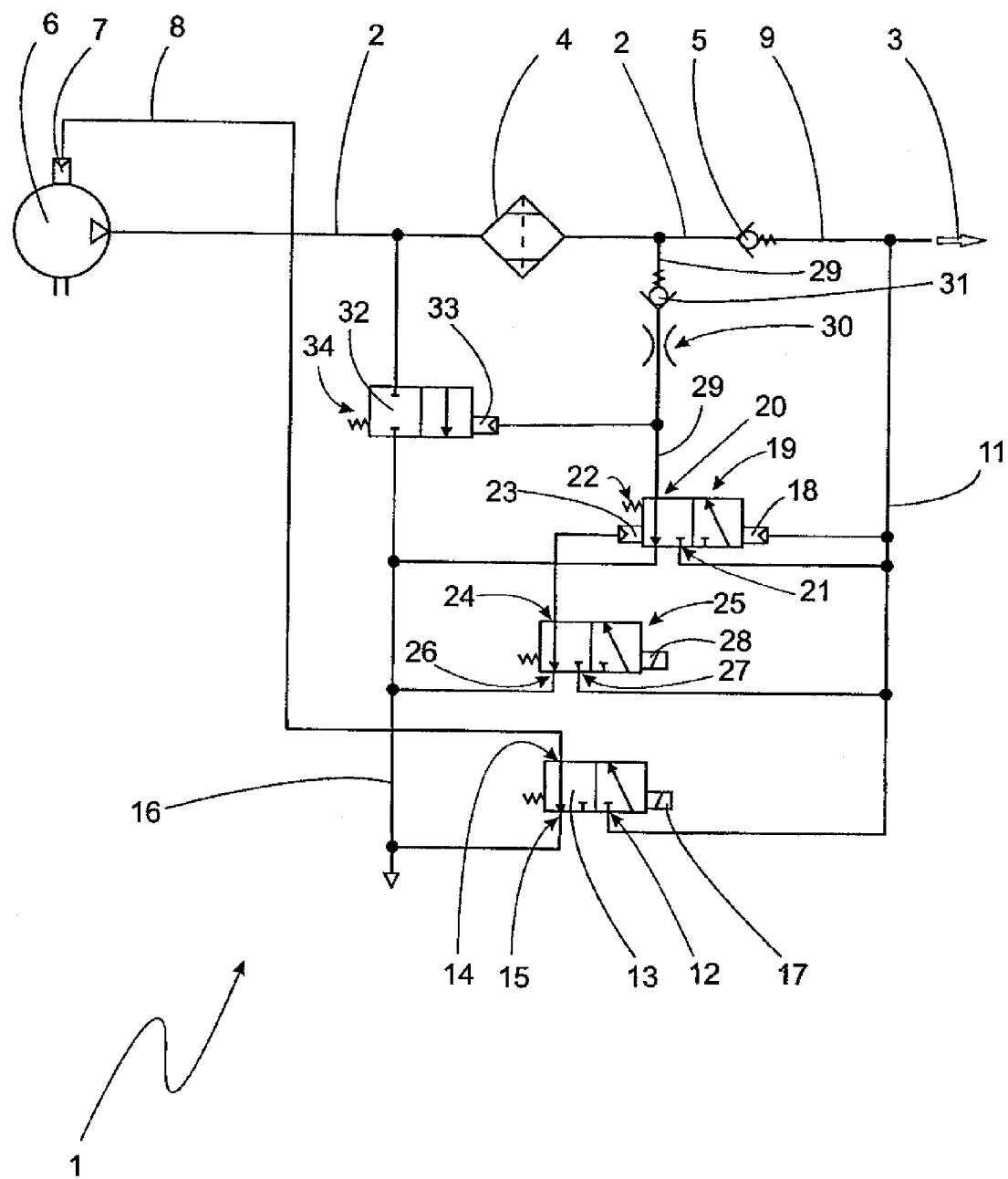
FIG. 1 is a circuit diagram of a compressed air preparation device according to a first exemplary embodiment of the present invention.

FIG. 1 shows an electrically controlled compressed air preparation device 1 with a pressure line 2, in which, as in the compressed air preparation devices according to FIGS. 2-5, a drying device 4 and a non-return valve 5 are likewise arranged adjacent one another in the through-flow direction 3. A multiple-circuit protective valve or safety valve (not shown here) is connected to the non-return valve 5, to which the multiple-circuit protective valve or safety valve individual pressure medium circuits (not shown) can be connected, such as the pressure medium circuits of a compressed air brake system of a motor vehicle.

In the following description, the common construction of all the exemplary embodiments will be described using the example of FIG. 1, and reference to distinguishing features of individual exemplary embodiments will be made at the respective point of the description of the corresponding figures.

In all exemplary embodiments, the compressed air feed takes place via a compressor 6. A pressure-actuatable control switch 7 of the compressor 6 forms a feed control element of the compressed air preparation device, with the result that the compressed air feed is switched directly into the pressure line 2. As an alternative, a pressure-actuatable control output of the compressor that discharges the compressor flow upon actuation, or a separate 3/2-way valve in the pressure line, can be provided as a pressure-actuatable feed control element that is assigned to the compressor 6. The compressor sucks in air from the atmosphere and outputs a compressed air flow into the pressure line 2. The control switch 7 can be actuated by compressed air via a compressor control line 8. As soon as the control pressure prevails at the control switch 7 via the compressor control line 8, the feeding in of compressed air is suppressed.

Downstream of the non-return valve 5, the pressure line 2 is adjoined by a system pressure line 9, in which the system pressure provided for the reservoir containers prevails. In order to apply the control pressure to the control switch 7, the compressor control line 8 can be fluidly connected to a store line 11 that branches off from the system pressure line 9 downstream of the non-return valve 5. The non-return valve 5 decouples the pressure line 2, which comes from the compressor from the reservoir containers (not shown), with the result that the system pressure level from the reservoir containers is maintained in the store line 11, even if the pressure line 2 is pressureless during the regeneration upstream of the non-return valve 5 in the flow direction 3.

The store line 11 is connected to the supply connection 12 of an electrically actuatable compressor valve 13. The compressor valve 13 is a second solenoid valve that is arranged in addition to an electrically actuatable regeneration valve, which controls the regeneration of the drying device and is described in greater detail below. In order to control the compressed air feed, the feed control element is connected to a working connection 14 of the compressor valve 13, that is, the control switch 7 via the compressor control line 8 in the exemplary embodiments shown. In all the exemplary embodiments, the compressor valve 13 is configured as a 3/2-way valve, the working connection 14 being connected either in a first switching position of the compressor valve 13 to the supply connection 12, that is, to the store line 11, or in a second switching position to a third connection, namely a ventilating connection 15. A ventilating line 16 is connected to the ventilating connection 15. In the exemplary embodiments, the ventilating line 16 serves to ventilate further valves, which are still to be described, of the respective compressed air preparation devices. As an alternative, a separate ventilating means can also be provided for each valve.

An electrically actuatable control input 17 of the compressor valve 13 is connected via an electrical line to an electronic control unit (not shown). Information that is determined continuously by suitable pressure sensors about the system pressure in that section of the pressure line 2 that lies downstream of the non-return valve 5 in the through-flow direction 3 (that is, in or downstream of the system pressure line 9) is input into the control unit. The system pressure is detected, for example, at the branching point of the store line 11 or in the store line 11. The control unit generates electrical control signals to control the compressor valve 13 as a function of this information and possibly further input signals.

Moreover, a first control input 18 of a pressure-actuatable governor valve 19 is connected to the store line 11. The governor valve 19 is configured as a 3/2-way valve, and is connected to the pressure line 2 and a feed control element for the compressed air feed by way of a working connection 20 as will be described in more detail below. The store line 11 is connected to a supply connection 21 of the governor valve 19. A ventilating connection of the governor valve 19 is connected to the ventilating line 16. The first control input 18 of the governor valve, which is connected to the store line 11, acts counter to the permanent restoring force of a valve spring 22. The governor valve 19 has a second pressure-actuatable control input 23 that works together with the valve spring 22 against the first control input 18.

A working connection 24 of an electrically actuatable regeneration valve 25 is connected to the second control input 23 of the governor valve 19. The regeneration valve 25 is a solenoid valve that is provided for controlling the regeneration of the drying device 4. As a result of the connection of the working connection 24 to the second control input 23 of the governor valve 19, there is pilot control of the pressure-controlled governor valve 19 by the electrically actuatable regeneration valve 25. The regeneration valve 25 is configured as a 3/2-way valve, the working connection 24 being connected alternatively to a ventilating connection 26, which is connected to the ventilating line 16 or to a supply connection 27 connected to the store line 11. An electrically actuatable control input 28 of the regeneration valve 25 is connected via an electrical line (not shown) to the electronic control unit. The control unit switches both the regeneration valve 25 and the compressor valve 13 to control the compressed air feed according to predefined values and with consideration of continuously measured operating parameters.

The ventilating line 16 branches off from the pressure line 2 upstream of the drying device 4 in the through-flow direction 3 of the pressure line 2. Downstream of the drying device 4 in the through-flow direction 3, a regeneration line 29 opens into the pressure line 2, which is connected to the working connection 20 of the governor valve 19. A throttle element and a non-return valve 31 are arranged in the regeneration line 29. The non-return valve 31 prevents a return flow from the pressure line 2 in the direction of the governor valve 19. In the exemplary embodiments of FIGS. 1, 4, and 5, the throttle element is configured as a diaphragm 30, and the non-return valve 31 is arranged downstream of the diaphragm 30 in the direction of the provided through-flow. Alternatively, the non-return valve 31 and the diaphragm 30 can be arranged in the reverse order to that shown.

A ventilating valve 32 is arranged in the ventilating line 16 between the pressure line 2 and the connection of the regeneration valve 25, the compressor valve 13, and the governor valve 19. The ventilating valve 32 is a 2/2-way valve and includes a pressure-dependent control input 33 that is fluidly connected to the regeneration line 29, similar to the working connection 20 of the governor valve 19. In the first switching position shown, the ventilating valve 32 shuts off the ventilating line 16. If the control pressure prevails in the regeneration line 29, the pressure-dependent control input 33 moves the ventilating valve 32 into the open position counter to the restoring force of a valve spring 34.

The ventilating line 16 is connected to a ventilating device 35 (shown by way of a symbol), which receives the discharged air that escapes from the ventilating connections of the connected valves and the regeneration air from the pressure line.

In the following description, the governor switchover pressure is denoted as the minimum pressure that has to prevail at the control input 18 (fed from the store line 11), in order, in the event of a pressureless control input 23, to move the governor valve 19 counter to the spring force 22 into the second switching position which fluidly connects the supply connection 21 to the working connection 20 and therefore switches the store line 11 through to the regeneration line 29.

In the following description, the governor switch-back pressure is denoted as the pressure level (lower than the governor switchover pressure), at which the governor switches back from the second switching position into the first switching position in the event of a control input 23 continuing to be pressureless. The pressure difference between these two pressures is called hysteresis of the governor.

The compressed air preparation device functions as described below.

The electronic control unit can set different operating modes of the electronically controllable compressed air preparation device by way of different combinations of the switching positions of the compressor valve 13 and the regeneration valve 25. Here, the governor valve 19 is pilot controlled via its control input 23 by the regeneration valve 25 above a governor switchover pressure. Accordingly, if the regeneration valve 25 is actuated, the governor valve 19 has to remain in the first switching position in which the regeneration line 29 is ventilated in its section that is connected to the working connection 20 and reaches as far as the non-return valve 31. The actuation of the regeneration valve 25, that is, the feeding of an electrical switching signal, moves the regeneration valve 25 into the second switching position in which its working connection 24 is connected to the supply connection 27 and a fluid connection is therefore produced between the store line 11 and the control input 23 of the governor valve 19. In this switching position, the working pressure of the pressure line 2, which working pressure prevails downstream of the non-return valve 5 in the flow direction, prevails via the store line 11 at both pressure-dependent control inputs 18, 23 of the governor valve 19. The counteracting valve forces of the two control inputs 18, 23 cancel each other out, with the result that the valve spring 22 holds the governor valve 19 in the valve position shown, in which the regeneration line 29 is connected to the ventilating line 16 in its section that is connected to the working connection 20 and reaches as far as the non-return valve 31. The ventilating valve 32 therefore remains closed, and regeneration is suppressed.

In a pump mode, the electrical switching signal is fed to the regeneration valve 25, with the result that the governor valve 19 shuts off the connection of the store line 11 to the regeneration line 29. At the same time, in this operating type, no control signal is fed to the compressor valve 13 for controlling the compressed air feed, with the result that it ventilates the compressor control line 8 in the switching position shown. The compressed air flow of the compressor 6 is therefore fed into the pressure line 2.

In an idling mode, the control unit feeds a control signal to the control input 17 of the compressor valve 13, as a result of which the compressor valve 13 is changed into the second switching position. Here, the working connection 14 of the compressor valve 13 is connected to the supply connection 12, which is connected to the store line 11. In this second switching position, the control pressure in the store line 11 is switched through to the control switch 7 of the compressor 6 and the compressed air feed into the pressure line 2 is disconnected.

In a regeneration mode, the control unit forwards an electrical actuating signal solely to the compressor valve 13, with the result that the compressed air feed to the pressure line 2 is shut off via the second switching position of the control switch 7 of the compressor 6. The actuating signal of the regeneration valve 25 is interrupted in the regeneration mode, with the result that the regeneration valve 25 falls into the first switching position shown, in which the second control input 23 of the governor valve 19 is connected to the ventilating line 16 and is therefore non-actuated. In this switching position, the pressure in the store line 11 still acts at the governor valve 19 only via the first control input 18. During normal operation of the electrical compressed air preparation device, the set working pressure is higher than the governor switchover pressure, at which the valve spring 22 holds the governor valve 19 in the first switching position. The working pressure overcomes the restoring force of the valve spring and moves the governor valve 19 into the second switching position, in which the governor valve 19 is open between the store line 11 and the regeneration line 29.

On account of the passage from the store line 11 to the regeneration line 29, the ventilating valve 32 in the ventilating line 16 is also switched to open, with the result that a through-flow of the drying device 4 is possible counter to the customary through-flow direction 3 of the pressure line 2 (in the region of the pressure line 2 between the branching point of the regeneration line 29 to the branching point of the ventilating line 16). As a result of the through-flow in the opposite direction of the pressure line 2 with dry air from the system containers of the motor vehicle, the drying device 4 or the adsorption agent contained in it is regenerated. Before the regeneration air flows into the pressure line 2, the compressed air flowing back is relieved to atmospheric pressure by the diaphragm 30 before it flows through the drying device 4 for regeneration. The stored moisture from the drying device 4 is discharged into the atmosphere with the air flow via the ventilating line 16, which is open in the regeneration mode.

Should the electrical power of the control unit fail while the motor vehicle is driving, the governor valve 19 assumes both the control of the system pressure and the regeneration of the drying device 4 in a backup mode. Without an electrical control signal, a passage to the store line 11 is produced neither at the compressor valve 13 nor at the regeneration valve 25. As soon as the governor valve 19 switches over and opens the regeneration line 29, at the same time the ventilating valve 32 is moved by the prevailing control pressure into the open switching position and the ventilating line 16 is opened. The compressed air flow of the compressor 6 is discharged via the ventilating line 16 and therefore the feed to the drying device 4 is suppressed. The governor valve 19 therefore assumes the control of the compressed air feed and uses the ventilating valve 32 as feed control element.

Even in the case of inactivity of the electrically controllable solenoid valves, namely the compressor valve 13 and the regeneration valve 25, a switchover of the compressed air feed by the governor valve 19 is therefore ensured. A switchover of the governor valve 19 takes place precisely when the pressure in the store line falls below a switch-back pressure (switch-off pressure minus hysteresis), at which the control input 18 can no longer overcome the restoring force of the valve spring 22. In the event of failure of the electrical control power, the governor valve 19 therefore holds the working pressure in the region of the pressure range defined by the valve spring 22 between the governor switchover pressure and the switch-back pressure.

Below the governor switchover pressure, the valve spring 22 holds the governor valve 19 in the position shown, as a result of which the ventilating valve 32, which is controlled by the governor valve 19, also shuts off the ventilating line 16, and the compressed air flow of the compressor 6 is guided to the drying device 4. When the working pressure in the system containers exceeds the governor switchover pressure, the governor valve 19 connects the store line 11 to the ventilating valve 32 and discharges the compressed air flow of the compressor 6 via the ventilating line 16. At the same time, the regeneration line 29 is open in this position of the governor valve 19, with the result that compressed air can flow back out of the system containers to the drying device for the purpose of regeneration. In this way, a regeneration of the drying device 4 is carried out every time when the system pressure exceeds the governor switchover pressure, with the result that a virtually unrestricted continuation of the journey of the motor vehicle is possible. The compressed air preparation device 1 therefore makes a "limp home" function available.

The function of the governor valve, namely assuming the control of pressure and regeneration when the governor switchover pressure is reached, is used in discharging operation ("cold dump"). Here, the electrical control unit forwards a control signal temporarily neither to the compressor valve 13 nor the regeneration valve 25. As a result, the compressed air feed is regulated via the ventilating valve, whereas the compressor 6 continues to convey hot air through the front part of the pressure line 2. This counteracts freezing of the devices through which flow passes, in particular the pressure line 2 and the ventilating valve 32. This takes place until the governor switch-back pressure (changeover pressure minus hysteresis) is reached and the governor valve 19 switches back or the electronic controller ends the discharging operation by switching the electrically actuatable solenoid valves. If, for example, the regeneration valve 25 is actuated, the compressed air preparation device changes over into the pump mode. The energized regeneration valve 25 suppresses the actuating signal at the ventilating valve 32 via the pilot controlled governor valve 19, as a result of which the ventilating line 16 is shut off and the compressed air flow of the compressor 6 is guided through the drying device 4 again.

The regeneration valve 25 is configured as a solenoid valve with a small opening diameter (for example, 1 mm), which is sufficient for the task of the pneumatic actuation of the governor valve 19. The compressor valve 13 has a larger opening diameter, for example, 1.6 mm, in order to ensure reliable switching of the pressure-actuatable control switch 7 of the compressor. The governor valve 19 is equipped with a large opening diameter, for example, 2 mm, in order to ensure a sufficient through-flow of the regeneration air flow and sufficient back pressure in the regeneration line 29 upstream of the throttle element, in order to close the ventilating valve 32 reliably.

Figure 2:
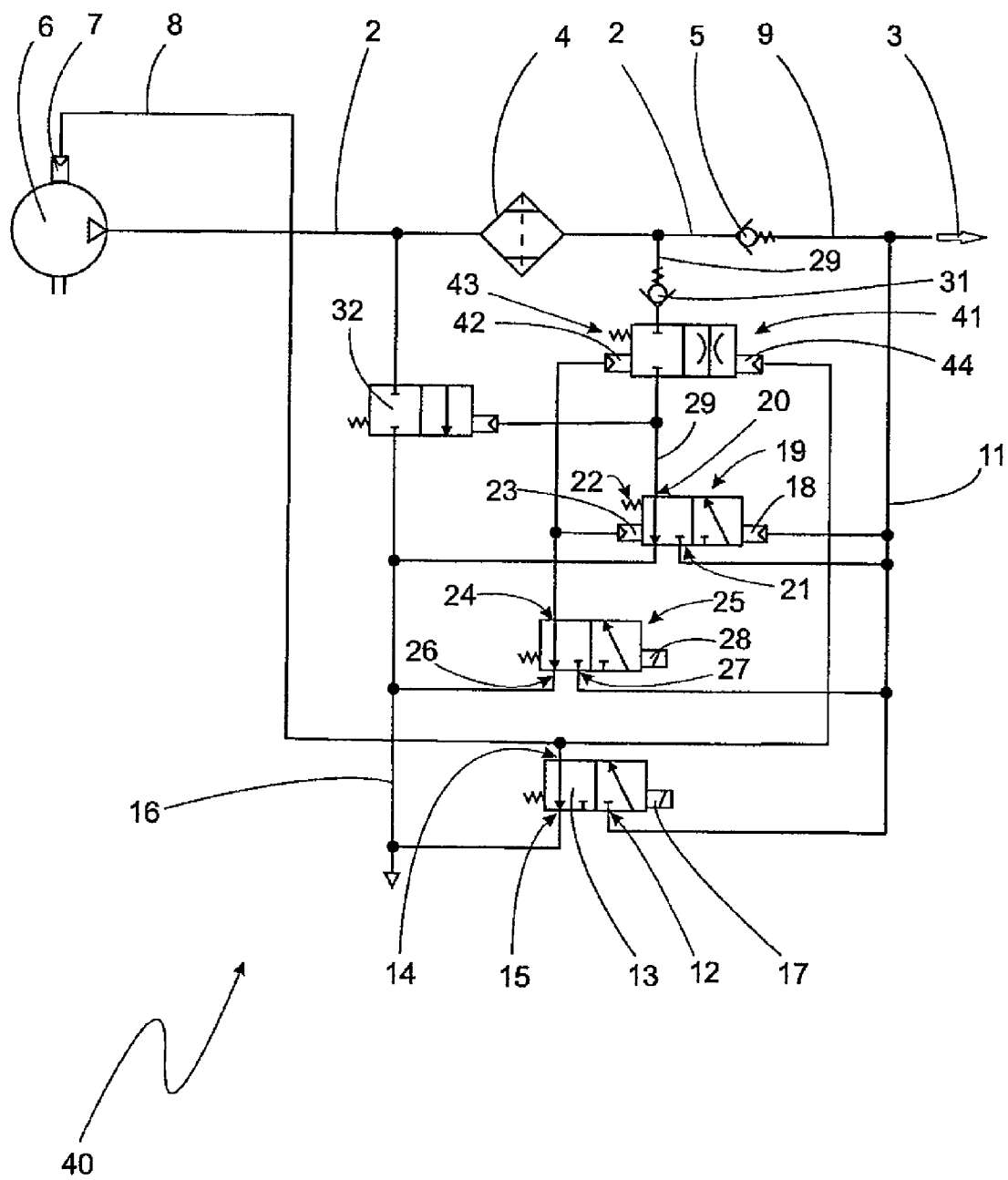
FIG. 2 is a circuit diagram of a compressed air preparation device according to a second exemplary embodiment of the present invention.

As a second exemplary embodiment of a compressed air preparation device, FIG. 2 shows a compressed air preparation device 40, in which a throttling valve 41 that can be switched by pressure actuation is arranged as throttle element in the regeneration line 29, instead of the diaphragm 30 of the compressed air preparation device 1 in FIG. 1.

Figure 3:
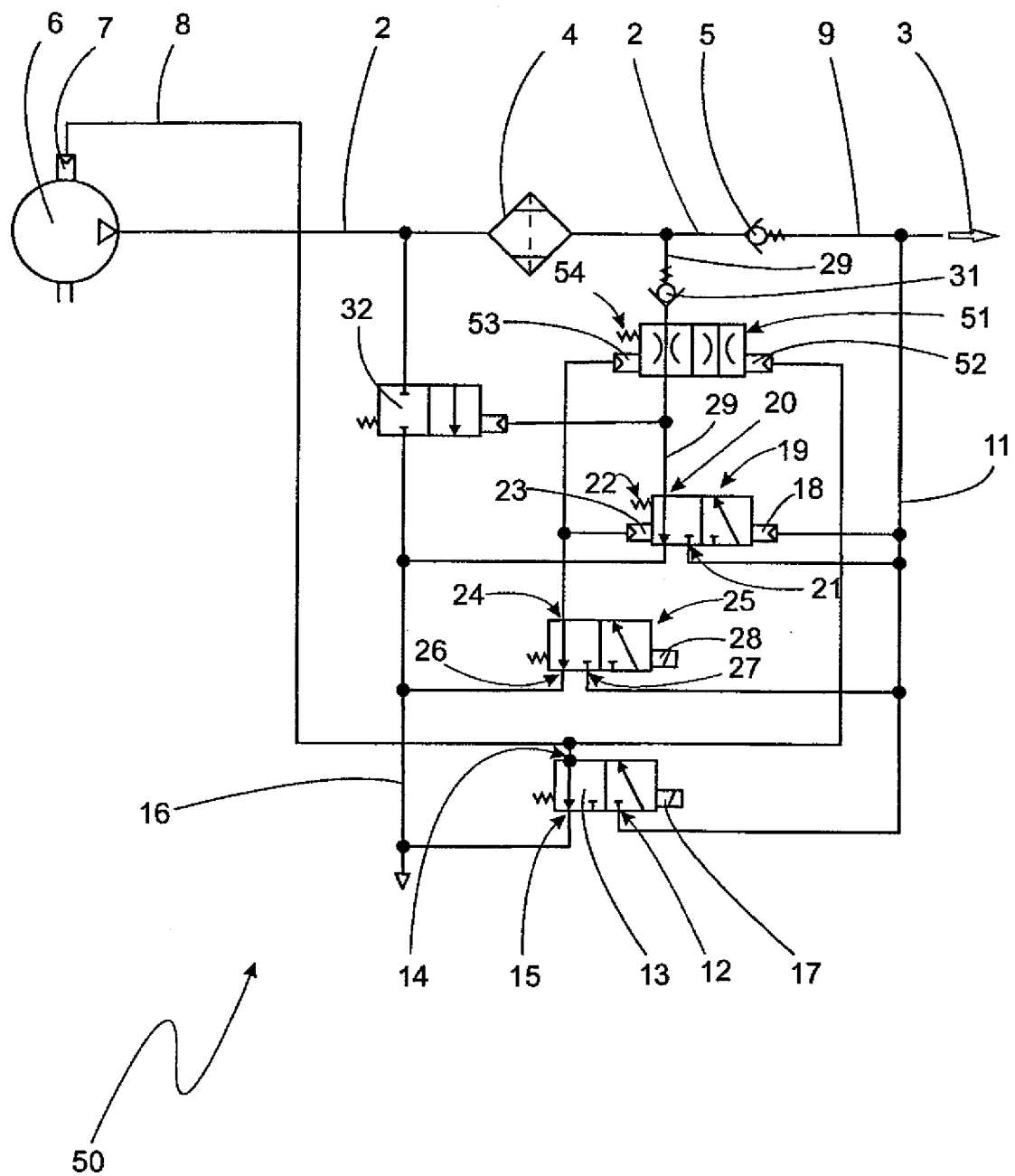
FIG. 3 is a circuit diagram of a compressed air preparation device according to a third exemplary embodiment of the present invention.
Figure 4:
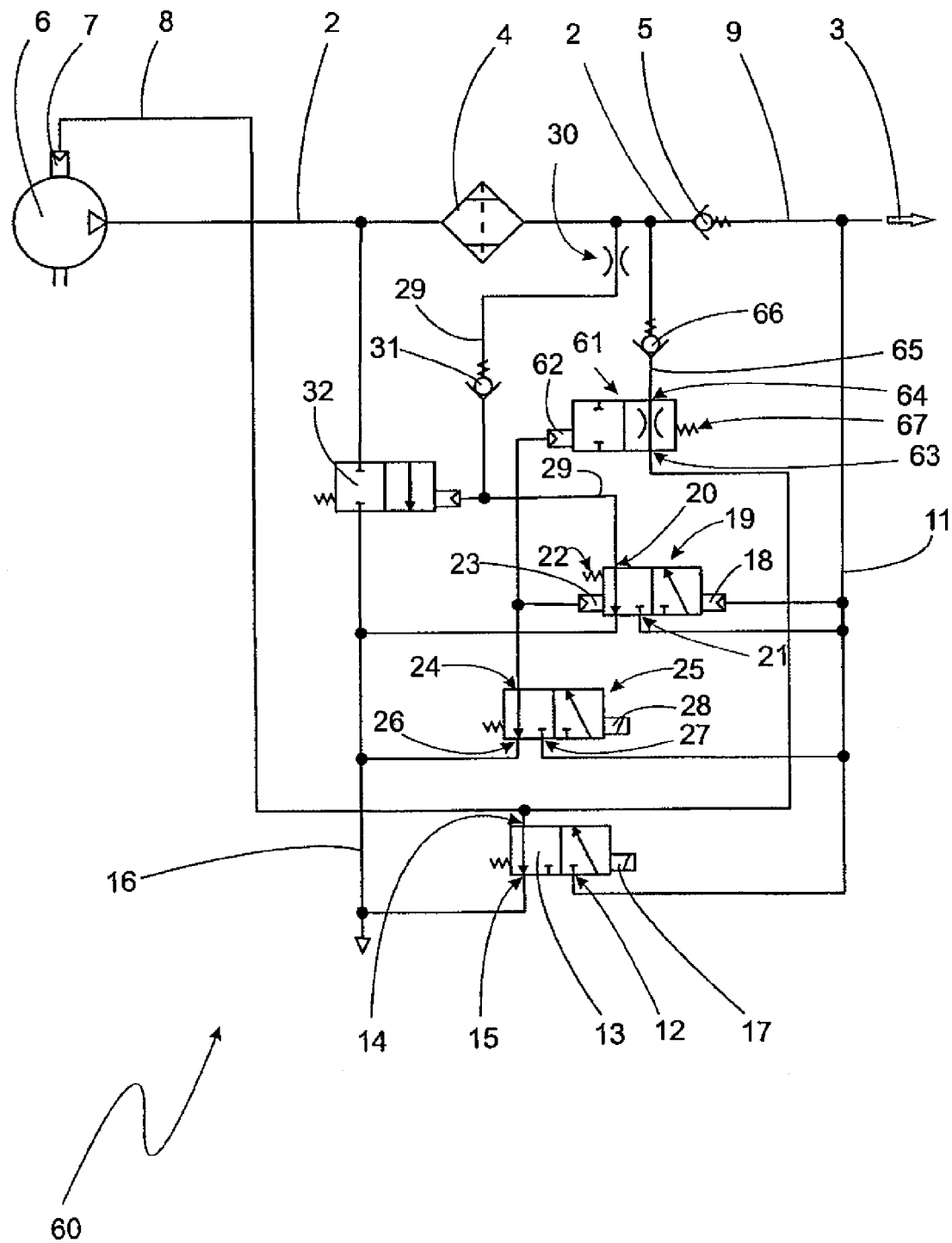
FIG. 4 is a circuit diagram of a compressed air preparation device according to a fourth exemplary embodiment of the present invention.
Figure 5:
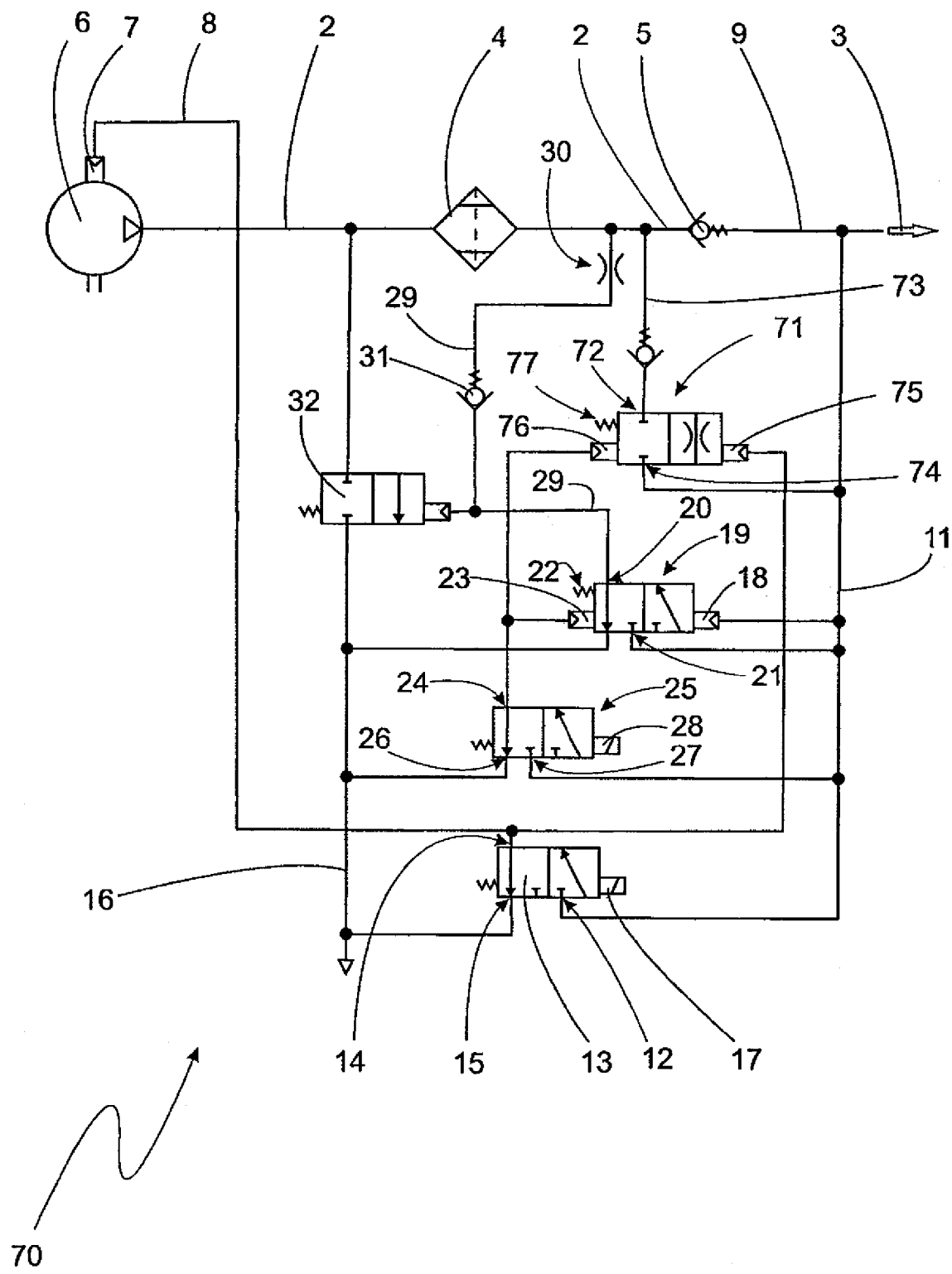
FIG. 5 is a circuit diagram of a compressed air preparation device according to a fifth exemplary embodiment of the present invention.

Similar to the throttling valves of the exemplary embodiments according to FIGS. 3-5, the switchable throttling valve 41 can be arranged upstream or downstream of the non-return valve 31.

The throttling valve 41 is designed as a 2/2-way valve, a control input 42 being connected to the working connection 24 of the regeneration valve 25. A valve spring 43 acts with its permanent restoring force counter to a pressure-actuatable coupling input 44 of the throttling valve 41. The coupling input 44 is a second control input of the throttling valve that can be actuated by the pressure medium, and that is connected to the working connection 14 of the compressor valve 13. In the case of the open position of the compressor valve 13, the system pressure from the store line 11 therefore prevails at the coupling input 44. Otherwise, the compressed air preparation device 40 corresponds to the construction described above with respect to FIG. 1.

In the pump operation, the electrical control signal is fed to the regeneration valve 25, with the result that the connection between the store line 11 and the ventilating valve 32 is interrupted at the governor valve 19 and the ventilating line 16 is shut off.

In the regeneration operation, as described above with respect to FIG. 1, the compressor valve 13 is actuated, resulting in the control switch 7 of the compressor 6 being actuated and the feeding of compressed air into the pressure line 2 being suppressed. At the same time, the feed of the control signal for the regeneration valve 25 is interrupted, with the result that the regeneration valve 25 passes into the first switching position shown. Here, the control input 42 of the throttling valve 41 is connected to the ventilating line 16 and the switching force of the control input 42 is canceled. At the same time, the actuation of the compressor valve 13 leads to the control pressure of the store line 11 being switched through to the coupling input 44 of the throttling valve 41. Under the prevailing control pressure of the store line 11, the coupling input 44 develops a force that overcomes the valve spring 43 and switches the throttling valve 41 into the open position.

Above a governor switchover pressure that is fixed by the valve spring 22 of the governor valve 19, the compressed air preparation device 40 determines the working pressure at the output of the pressure line by setting the compressor valve 13 and the regeneration valve 25. In the event of failure of the electrical control power, the compressed air preparation device 40 falls into a backup mode, with the governor valve 19 holding the pressure in the manner described above with respect to FIG. 1, i.e., in the range between the governor switchover pressure and the governor switch-back pressure (switchover pressure minus hysteresis).

As a third exemplary embodiment of a compressed air preparation device, FIG. 3 shows a compressed air preparation device 50, in which a switchable throttling valve 51 having two control inputs, that can be actuated by pressure and two different passage cross-sections is provided in the regeneration line 29 as a throttle element. Here, a control input 52 is connected to the working connection 24 of the regeneration valve 25. A pressure-actuatable coupling input 53 is connected to the working connection 14 of the compressor valve 13 that is used for the control of the compressed air feed. The coupling input 53 acts counter to the control input 52 and the restoring force of a valve spring 54. Otherwise, the compressed air preparation device 50 corresponds to the construction described above with respect to FIG. 1.

In the regeneration operation, the connection of the coupling input 53 of the throttling valve 51 to the working connection 14 of the compressor valve 13 leads to the control pressure of the store line 11 being switched through to the throttling valve 51, as a result of which the throttling valve 51 assumes its second switching position with a larger passage cross-section (for example, 1.5 mm). In the backup mode, in the event of failure of the electrical control power, the throttling valve 51 switches into the first switching position, in which a smaller passage cross-section (for example, 0.5 mm) is open. As a result, optimum relief of the dry compressed air out of the system containers is achieved at the pressure level, which is reduced to governor switchover pressure in backup operation. In the event of failure of the electrical control power, both the compressor valve 13 and the regeneration valve 25 are situated in the first switching position shown, the respective working connection 14, 24 being ventilated. No control pressure therefore prevails at both control inputs of the throttling valve 51 and the valve spring 54 switches the throttling valve 51 into the switching position with a smaller passage cross-section.

In discharging operation (cold dump), the switching off of the electrical control signals, both of the compressor valve 13 and of the regeneration valve 25 in the compressed air preparation device 50, leads to a regeneration flow being set through the smaller passage cross-section of the throttling valve 51.

As a fourth exemplary embodiment of a compressed air preparation device, FIG. 4 shows a compressed air preparation device 60, in which a switchable throttling valve 61 configured as a 2/2-way valve is provided for controlling the regeneration air flow. In contrast to the remaining exemplary embodiments, the throttling valve 61 has a single pressure-actuatable control input 62 that is connected to the working connection 24 of the regeneration valve 25.

In contrast to the exemplary embodiments of the compressed air preparation devices according to FIGS. 1-3, the switchable throttling valve 61 of the compressed air preparation device 60 is not arranged in the regeneration line 29. A supply connection 63 of the throttling valve 61 is connected to the working connection 14 of the second solenoid valve 13 for the control of the compressed air feed, and a working connection 64 of the throttling valve 61 is connected to the pressure line 2 via a connecting line 65. The connecting line 65, in which a non-return valve 66 is arranged, opens parallel to the regeneration line 29 into the pressure line 2 between the drying unit 4 and the non-return valve 5. The regeneration line 29 is connected to the working connection 20 of the governor valve 19 in the manner described above with respect to FIG. 1, by way of a diaphragm 30 and a non-return valve 31, which is arranged in the regeneration line 29.

The throttling valve 61 therefore controls the connecting line 65 and thus a second flow path for regeneration air.

The diaphragm 30 in the regeneration line 29 is configured in this embodiment with a considerably smaller diameter than the switchable throttling valve 61 (e.g., 0.5 mm), with the result that the through-flow, if both throttle elements are open in parallel, again in total makes optimum regeneration possible.

The through-flow through the compressor valve 13 is considerably greater in the embodiment according to FIG. 4 than in the exemplary embodiments according to FIGS. 1-3, and ensures reliable control of the compressor 6 with simultaneous outflow of compressed air through the throttling valve 61.

The control input 62 of the throttling valve 61, which is connected to the regeneration valve 25, acts counter to the permanent restoring force of a valve spring 67, which holds the throttling valve 61 in the open switching position in the non-actuated state.

Otherwise, the compressed air preparation device 60 corresponds to the construction described above with respect to FIG. 1.

If the regeneration valve 25 is supplied with the control signal by the electrical control unit, the pressure of the store line 11 acts on the control input 62 and switches the throttling valve 61 into the non-open second switching position.

In regeneration operation of the compressed air preparation device 60, the regeneration valve 25 connects the ventilating line 16 to the second control input 23 of the governor valve 19 in the manner described above, with the result that the governor valve 19 connects the control pressure of the store line 11 to its working connection 20, switches over the ventilating valve 32 and opens the ventilating line 16. If the regeneration valve 25 is not actuated, the throttling valve 61 is situated in the first switching position, in which it is open. The throttling valve 61 is therefore open via the passage cross-section for a connection from the compressor valve 13 to the pressure line 2. Moreover, the compressor valve 13 is supplied with an electrical control signal and the store line 11 is therefore fluidly connected to the supply connection 63 of the throttling valve 61. The regeneration air then flows directly via the compressor valve 13 to the throttling valve 61, bypassing the governor valve 19, and finally passes through the connecting line 65 into the pressure line 2, in order to flow backward through the drying device 4. In this way, regeneration air can be guided both through the regeneration line 29 and through the connecting line 65 to the drying device 4.

In regeneration operation, both the regeneration line 29 and the connecting line 65 are therefore opened as parallel flow path for the return flow into the pressure line 2, with the result that in total there is a large passage cross-section.

In backup operation, that is, after failure of the electrical control power, the compressor valve 13 switches into the first switching position, in which the throttling valve 61 is not supplied. In backup operation, a regeneration of the drying device 4 is assumed by the pressure-dependent control of the governor valve 19. In the manner described above with respect to FIG. 1, the governor valve 19 opens a connection from the store line 11 to the pressure line 2 if the governor switchover pressure is exceeded in backup operation. At the same time, the compressed air feed from the compressor 6 is suppressed by opening of the ventilating valve 32.

In discharging operation ("cold dump"), the control unit forwards an electrical signal neither to the compressor valve 13 nor to the regeneration valve, with the result that only the passage cross-section of the regeneration line 29 is opened. In contrast, the connecting line 65 is shut. In this way, a comparatively small passage cross-section is open in comparison with regeneration operation. As a result, an optimum compromise can be found between the discharging of warm air from the compressor 6 for the purpose of de-icing with as low a mass flow as possible in the opposite through-flow direction of the dryer, the mass flow being desired merely for the regeneration.

As a fifth exemplary embodiment of a compressed air preparation device, FIG. 5 shows a compressed air preparation device 70 that is similar to the arrangement according to FIG. 4. As shown in FIG. 5, compressed air preparation device 70 includes a throttling valve 71, which is configured as a 2/2-way valve, that controls, by way of its working connection 72, a connecting line 73 that opens into the pressure line 2 parallel to the regeneration line 29 downstream of the drying device 4 in the through-flow direction 3. In contrast to the arrangement according to FIG. 4, the supply connection 74 of the throttling valve 71 is fluidly connected to the store line 11 in the pressure preparation device 70. In an analogous manner to the throttling valve 41 in FIG. 2, the throttling valve 71 has two pressure-actuatable control inputs that act counter to one another. Here, in a similar manner to the exemplary embodiments according to FIGS. 2-4, one control input 75 is connected to the working connection 24 of the regeneration valve 25. In order to link the switching of the throttling valve 71 and therefore the regeneration control to the compressor valve 13, a coupling input 76 of the throttling valve 71 is fluidly connected to the working connection 14 of the compressor valve 13.

In the regeneration operation, in the case of the non-actuated switching position of the regeneration valve 25, the control input 75 of the throttling valve 71 also remains non-actuated, and the compressor valve 13 connects the store line 11 both to the compressor control line 8 and to the coupling input 76, which moves the throttling valve into the open switching position counter to the permanent restoring force of a valve spring 77.

Otherwise, the compressed air preparation device 70 corresponds to the construction described above with respect to FIG. 1.

In the exemplary embodiment according to FIG. 5, the working connection 14 of the compressor valve 13 serves only for signal transmission to the throttling valve and to the compressor circuit, with the result that no pressure losses are produced by fluid flows. The control switch 7 of the compressor 6 can therefore be switched more reliably. The compressor valve 13 can also be of smaller dimensions structurally and costs can be saved as a result.

It should be appreciated that the switchable throttling valve, which controls a connecting line analogously to the exemplary embodiments of FIG. 4 and FIG. 5, can be configured with different passage cross-sections in the switching states.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air preparation device comprising: a pressure line configured to conduct compressed air; a drying device disposed in the pressure line, a pressure-actuatable governor valve coupled to the drying device; and an electrically actuatable solenoid valve, the governor valve being (i) pilot controllable by the solenoid valve at a high pressure level to allow the compressed air to be fed through the pressure line when the solenoid valve is actuated and (ii) configured to control regeneration of the drying device in response to a low pressure level from the solenoid valve when an electrical supply to the solenoid valve fails.

2. The compressed air preparation device as claimed in claim 1, further comprising a regeneration line connected to the governor valve, the regeneration line being configured to feed regeneration air to the drying device via the pressure line downstream of the drying device in a through-flow direction of the pressure line; and a ventilating line that branches off from the pressure line upstream of the drying device in the through-flow direction.

3. The compressed air preparation device as claimed in claim 2, further comprising a ventilating valve disposed in the ventilating line, the ventilating valve having a control input connected to the regeneration line.

4. The compressed air preparation device as claimed in claim 2, wherein the electrically actuatable solenoid valve is configured to control air flow in the regeneration line the compressed air preparation device further comprising a compressed air feed control element; and a compressor valve that controls feeding of the compressed air, the compressor valve having a working connection that is connected to the feed control element.

5. The compressed air preparation device as claimed in claim 2, further comprising a throttle element disposed in the regeneration line.

6. The compressed air preparation device as claimed in claim 1, further comprising a throttling valve switchable by pressure actuation, the throttling valve having a control input connected to a working connection of the solenoid valve.

7. The compressed air preparation device as claimed in claim 6, wherein the throttling valve has a coupling input that is (i) switchable by the pressure actuation, (ii) connected to a working connection of a compressor valve, and (iii) acts counter to actuation of the throttling valve by the control input and counter to a restoring force of a valve spring.

8. The compressed air preparation device as claimed in claim 6, wherein the throttling valve has two switching states with different passage cross-sections, a passage cross-section in a non-actuated state of the throttling valve being smaller than a passage cross-section in an actuated state.

9. The compressed air preparation device as claimed in claim 6, wherein the throttling valve is disposed in a connecting line that opens into the pressure line substantially parallel to a regeneration line downstream of the drying device in a through-flow direction of the pressure line, wherein the throttling valve is connectable to a pressure-conducting store line via a compressor valve, and wherein a supply connection of the throttling valve is connected to one of the store line and a working connection of the compressor valve.

10. A motor vehicle having the compressed air preparation device as claimed in claim 1.

* * * * *